US009837124B2

(12) United States Patent
Wolfkill et al.

(10) Patent No.: US 9,837,124 B2
(45) Date of Patent: Dec. 5, 2017

(54) LAYERED INTERACTIVE VIDEO PLATFORM FOR INTERACTIVE VIDEO EXPERIENCES

(71) Applicant: MICROSOFT TECHNOLOGY LICENSING, LLC, Redmond, WA (US)

(72) Inventors: Kiki Wolfkill, Seattle, WA (US); Cesare John Saretto, Greenbrier, WA (US); Daniel J. Chosich, Seattle, WA (US); Tony Hau, Seattle, WA (US); Adam S. Callens, Redmond, WA (US); Sandra Jolly Lemon, Bothell, WA (US); Duncan James McKay, Woodinville, WA (US); Jesse Paul Roberts, Seattle, WA (US); Michael Raymond Gerhardt, Clinton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/788,262

(22) Filed: Jun. 30, 2015

(65) Prior Publication Data

US 2017/0004861 A1  Jan. 5, 2017

(51) Int. Cl.
*G11B 27/00* (2006.01)
*H04N 5/93* (2006.01)
(Continued)

(52) U.S. Cl.
CPC ......... *G11B 27/036* (2013.01); *H04N 5/9305* (2013.01); *H04N 21/2181* (2013.01);
(Continued)

(58) Field of Classification Search
CPC .................................................. H04N 5/9305
(Continued)

(56) References Cited

U.S. PATENT DOCUMENTS 7,702,728 B2  4/2010 Zaner et al.
8,108,787 B2  1/2012 Finger et al.
(Continued)

FOREIGN PATENT DOCUMENTS

WO  2012085659 A1  6/2012
WO  2013138370 A   9/2013
WO  WO 2013138370 A1 * 9/2013 ......... H04N 21/4314

OTHER PUBLICATIONS

Clothier, Paul, "Interactive Video: The Next Big Thing in Mobile", Published on: Oct. 28, 2013, Available at: http://www.learningsolutionsmag.com/articles/1292/interactive-video-the-next-big-thing-in-mobile.

(Continued)

*Primary Examiner* — Hung Dang
*Assistant Examiner* — Girumsew Wendmagegn
(74) *Attorney, Agent, or Firm* — Shook, Hardy & Bacon L.L.P.

(57) ABSTRACT

In various embodiments, methods and systems for generating interactive videos based on a layered interactive video platform are provided. An interactive graphics track is received using a layered video platform that supports interactive graphics tracks functionality on interactivity content editor components, content management components, and interactivity components on end-user media devices. The interactive graphics track comprises interactivity instructions that initialize cloud-based interactivity services. An interactivity content editor component can be used to generate interactive graphics tracks and develop interactivity instructions for composing the interactive graphics elements. Composing the interactive graphics elements is based on executing the interactivity instructions that define features of the interactive graphics elements. Composing the interactive graphics elements comprises accessing cloud-based interactivity services corresponding to the interactiv- (Continued)

ity instructions. The interactive graphics tracks can be maintained separately from the video content. The interactive graphics elements are supported using the cloud-based interactivity services and layered over the video content.

20 Claims, 7 Drawing Sheets (51) Int. Cl.
*G11B 27/036* (2006.01)
*H04N 21/462* (2011.01)
*H04N 21/4722* (2011.01)
*H04N 21/8545* (2011.01)
*H04N 21/218* (2011.01)
*H04N 21/2187* (2011.01)
*H04N 21/235* (2011.01)
*H04N 21/2665* (2011.01)
*H04N 21/2668* (2011.01)
*H04N 21/81* (2011.01)
*H04N 21/854* (2011.01)
*H04N 21/43* (2011.01)
*H04N 21/4788* (2011.01)
*H04N 21/8547* (2011.01)

(52) U.S. Cl.
CPC ..... *H04N 21/2187* (2013.01); *H04N 21/2353* (2013.01); *H04N 21/2665* (2013.01); *H04N 21/2668* (2013.01); *H04N 21/4622* (2013.01); *H04N 21/4722* (2013.01); *H04N 21/8146* (2013.01); *H04N 21/854* (2013.01); *H04N 21/8545* (2013.01); *H04N 21/4307* (2013.01); *H04N 21/4788* (2013.01); *H04N 21/8547* (2013.01)

(58) Field of Classification Search
USPC .......................................................... 386/278
See application file for complete search history.

(56) References Cited

U.S. PATENT DOCUMENTS

| 8,270,303 | B2 | 9/2012 | Sauerwein et al. |
| 8,473,996 | B2 | 6/2013 | Gordon et al. |
| 8,488,011 | B2 | 7/2013 | Blanchflower et al. |
| 2004/0189793 | A1 | 9/2004 | Wang et al. |
| 2005/0246758 | A1 | 11/2005 | Khandelwal et al. |
| 2009/0165041 | A1 | 6/2009 | Penberthy et al. |
| 2010/0138863 | A1 | 6/2010 | Diaz Perez |
| 2012/0326993 | A1 | 12/2012 | Weisman |
| 2014/0013373 | A1 | 1/2014 | Huang et al. |
| 2014/0013381 | A1 | 1/2014 | Herigstad et al. |
| 2015/0100999 | A1 | 4/2015 | McKenna et al. |

OTHER PUBLICATIONS

"Annotations", Published on: Aug. 6, 2012, Available at: https://www.youtube.com/yt/playbook/en-GB/annotations.html.
Bringhurst, Bob, "Stacking Order of Overlays", Published on: Jun. 26, 2013, Available at: http://blogs.adobe.com/indesigndocs/2013/06/stacking-order-of-overlays.html.
Lawler, Ryan, "Flixmaster makes HTML5 video interactive", Published on: Aug. 2, 2011, Available at: https://gigaom.com/2011/08/02/flixmaster/.
"INXPO's Webcasting Solution", Published on: Feb. 10, 2014, Available at: http://reach.inxpo.com/rs/inxpoinc/images/Webcasting-Product-Sheet.pdf.
Nicole, Kristen, "CoverItLive interactive widget for bloggers", Published on: Nov. 16, 2007, Available at: http://mashable.com/2007/11/26/coveritlive/.
Lanier, Wren, "The Z-Axis: Designing for the Future", In Proceedings of Graphic Design, Apr. 8, 2014, Available at: http://alistapart.com/article/the-z-axis-designing-for-the-future.
"BIMvid Closed Captions: Live Streaming", Published on: Mar. 29, 2013, Available at: http://www.bimvid.com/closedcaptions-live.
"Second Written Opinion Issued in PCT Application No. PCT/US2016/039851", dated May 11, 2017, 7 Pages.
"International Preliminary Report on Patentability Issued in PCT Application No. PCT/US2016/039851", dated Aug. 11, 2017, 8 Pages.

* cited by examiner

LAYERED INTERACTIVE VIDEO PLATFORM FOR INTERACTIVE VIDEO EXPERIENCES

BACKGROUND

Interactive video includes the integration of interactive features with linear video. Interactive videos can be developed for a variety of different industries from e-commerce to entertainment. Interactive video can include interactive features that improve the presentation of video content to viewers. Developing interactive video can be based on proprietary platforms that target individual types of devices, during specific viewing experiences, for providing the interactive video content. Having a comprehensive development environment that facilitates a broad range of interactive features and services can maximize productivity in developing interactive videos and allow for robust interactive video experiences.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein provide methods and systems for generating interactive video content based on a layered interactive video platform system. An interactive graphics track is received at an interactivity component using a layered video platform, where the layered video platform supports interactive graphics tracks functionality based on interactivity content editor components, content management components, and interactivity components of end-user media devices. The interactive graphics track comprises interactivity instructions that initialize cloud-based interactivity services. An interactivity content editor component can be used to generate interactive graphics tracks based on programmatically defining interactive graphics elements to corresponding portions of video content and developing interactivity instructions for composing the interactive graphics elements at a media device interactivity component. Composing the interactive graphics elements is based on executing the interactivity instructions that define features of the interactive graphics elements. Composing the interactive graphics elements comprises accessing cloud-based interactivity services corresponding to the interactive instructions. It is contemplated that interactive graphics tracks and cloud-based interactivity services are implemented based on an interactivity context comprising user input, active video content, and corresponding interactivity metadata. The interactive graphics track can be maintained separately from the video content track but supported in combination based on the layered interactive video platform. The interactive graphics elements supported using the cloud-based interactivity services are layered over the video content.

BRIEF DESCRIPTION OF THE DRAWINGS

The present invention is described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments are described with reference to distributed computing devices, components, and a cloud computing infrastructure that supports cloud-based interactivity services utilizing a layered interactive video platform. Components can be configured for performing novel aspects of embodiments, where configured for comprises programmed to perform particular tasks or implement particular abstract data types using code. It is contemplated that the methods described herein can be performed in different types of operating environments having alternate configurations of the functional components described herein. As such, the embodiments described herein are merely exemplary, and it is contemplated that the techniques may be extended to other implementation contexts.

Interactive video includes the integration of interactive features with linear video. Interactive videos can be developed for a variety of different industries from e-commerce to entertainment. Interactive videos can include interactive features that improve the presentation of video content to viewers. Developing interactive video can be based on proprietary platforms that target individual types of devices, for particular viewing experiences, to provide interactive video content. Having a comprehensive development environment that facilitates a broad range of interactive features and services can maximize productivity in developing interactive videos and allow for robust interactive video experiences.

Conventional interactive video content providers have generally provided lightly interactive video experiences with no single interactive video content platform existing across multiple types of media devices. Moreover, developers lack a comprehensive toolset which enables content producers to consistently and easily build interactive experiences for video content. In particular, live video, streaming interactive content, is frequently not particularly well-supported for development or presentation for viewing. In this regard, conventional interactive video content can be limited and inefficient in implementation.

Embodiments of the present invention provide simple and efficient methods and systems for generating interactive video content based on a layered interactive video platform system that supports an end-to-end software-based platform. The layered interactive video platform system supports generating and transmitting interactive graphics tracks, between interactivity content editor components, content management components, and interactivity components in end-user platforms. The layered interactive video platform system provides for enriching interactive video content because the interactive graphics tracks include interactivity instructions comprising interactivity instructions that initialize cloud-based interactivity services. It is further contemplated that the interactivity instructions can also initialize hybrid-based interactivity services and locally-based interactivity services.

At a high level, interactive graphics elements can be overlaid on video streams (e.g., pre-recorded and live video content) based on a layered interactive video platform. The layered interactive video platform includes several different components, such as, an interactivity content editor component, a content management component in a cloud computing infrastructure, and an end-user media device having an interactivity component, that are programmed to perform specific tasks. The interactivity content editor component and the content management component can be used to generate interactivity instructions that are processed within the layered interactive platform, such that, the end user device having the interactivity component can generate interactive graphics elements based on the interactivity instructions.

Further, the layered interactive video platform can be based on web technology presentation layer in that the different components support caching, composition, exception management, input, layout, navigation, presentation entities, request processing, User Interface (UI) components, UI process component, and validation, based on the presentation layers. In this regard, the layered interactive platform functionality can be seamlessly communicated between components and dynamically overlaid on video streams or video content transmitted to media devices. The layered interactivity platform can implement interactive graphics tracks on media devices, such that, the interactive graphics tracks and cloud-based interactivity services are implemented based on an interactivity context comprising user input, active video content, and corresponding interactivity metadata.

Figure 1:
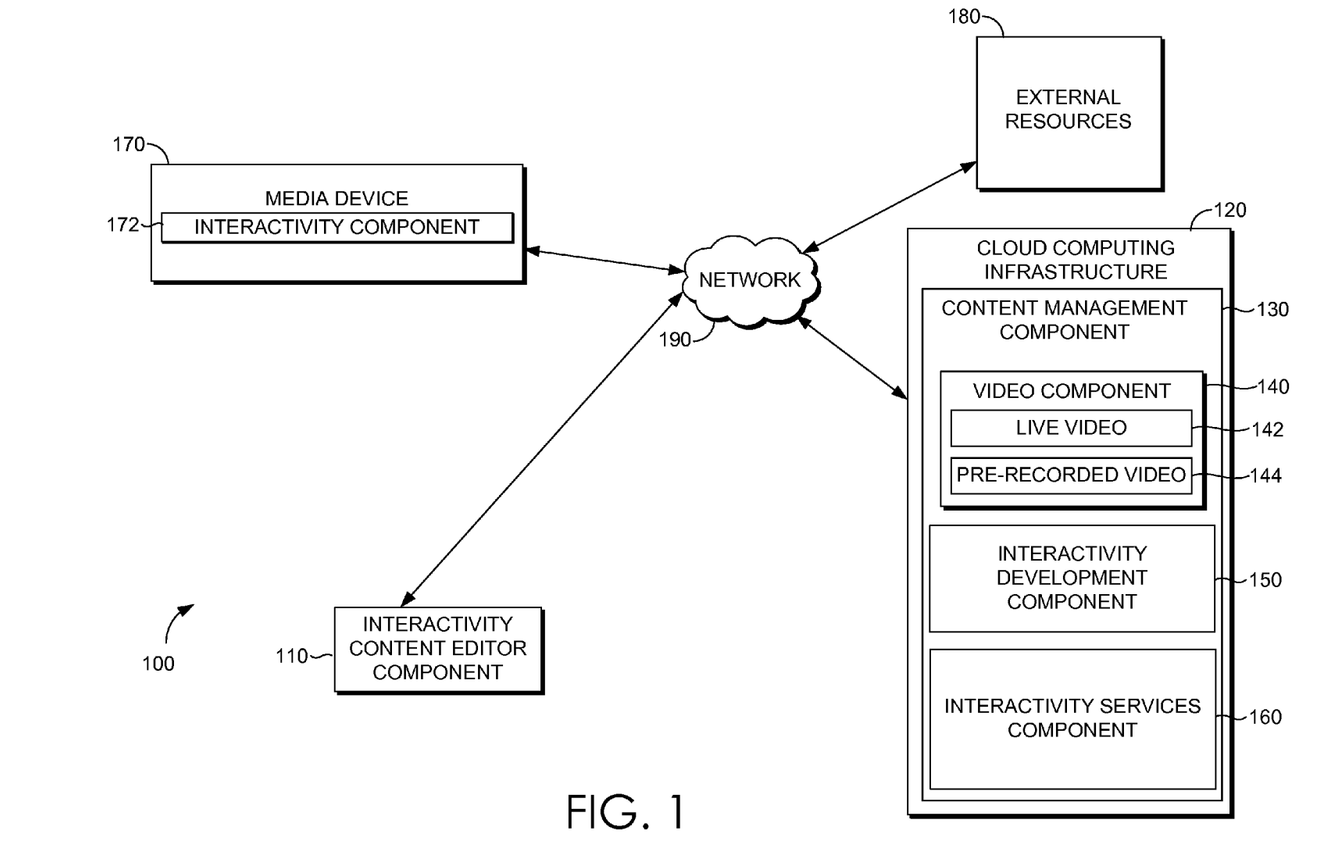
FIG. 1 is a block diagram of an exemplary layered interactive video platform system in which embodiments described herein may be employed.

Referring now to FIG. 1, FIG. 1 illustrates an exemplary layered interactive video platform system ("interactive system") 100 in which implementations of the present disclosure may be employed. In particular, FIG. 1 shows a high level architecture of interactive system 100 having an infrastructure and communicating using platform components in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, interactive system 100 includes an interactivity content editor component 110, a cloud computing infrastructure 120 comprising a content management component 130 having a video component 140, an interactivity development component 150, and interactivity services component 160, and a media device 170 having an interactivity component 172, and external resources 180 all in communication in a local area network 190. The components of the interactive system 100 may communicate with each other over a network, which may include, without limitation, one or more local area networks (LANs) and/or wide area networks (WANs). Any number of nodes (e.g., servers) and client computing devices may be employed within the interactive system 100 within the scope of implementations of the present disclosure.

At a high level, in the interactive system 100, the components are provided by a layered interactive video platform. The layered video platform comprises several components operating together to provide cloud-based interactive functionality described herein. The interactivity content editor component 110 can be used to generate interactive graphics tracks having interactivity instructions that initialize cloud-based interactivity services using an interactivity component 172 on a media device 170. When the interactivity instructions are executed, the interactivity instructions facilitate composing interactive graphics elements on the media device 170, defined in the interactive graphics tracks, on a media device having an interactivity component 172. It is contemplated that interactive graphics tracks and cloud-based interactivity services are implemented based on an interactivity context comprising user input, active video content, and corresponding interactivity metadata.

Generating the interactive graphics tracks can be based on an integrated development environment that provides comprehensive facilities for developing interactive graphics tracks through the interactivity development component 150. Also, the interactive graphics tracks can comprise cloud-based interactivity based on interactivity services component 160. The interactivity content editor component 110 can communicate the interactive graphics track to the content management component 130 where the interactive graphics can be stored, processed and transmitted with video content from video component 140 to the interactivity component 162. The interactivity component 162 can receive the interactive graphics track with a corresponding video content and layer over interactive graphics elements over video content.

Having described various aspects of the interactive system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure.

Various aspects of the technology described herein are generally directed to systems, methods, and computer storage media for, among other things, generating interactive content on media devices. A media device 170 (e.g., computing device, television, mobile device, game console) may communicate with a cloud computing infrastructure 120 to receive video content with corresponding interactive graphics tracks that support cloud-based interactivity services. Initially, video content can be generated by content producers. Content producers can generate pre-recorded video content or live content and process the video content using a video component 140 having live video 142 and pre-recorded video 144 units. The video component 140 can be accessed using an interactivity content editor component 110 when generating interactive graphics for the corresponding video content. The video component 140 can be implemented in the content management component of a cloud computing infrastructure, such that, the video streams that contain video content are delivered from the content management component 130 to media devices. It is contemplated that the video component 140 can be implemented independently and thus capable of communicating video content separately from the content management component 130 and the cloud computing infrastructure.

The interactivity content editor component 110 can facilitate developing multiple interactive graphics tracks (e.g., metadata tracks) that are associated with video content. It is contemplated that generating interactive graphics tracks at an interactivity content editor component 110 may trigger creation of corresponding project data (e.g., graphics, files and folders) in the content management component 130. The interactive content editor can optionally be implemented as a cloud-based application accessed remotely using a computing device. In this regard, generating interactive graphics tracks can be performed locally, or in a distributed computing system, or a combination thereof.

The interactivity content editor component 110 can also facilitate developing interactive graphics tracks based on different types of inputs that trigger different type interactive graphics elements. The instructions defined for an interactive graphics track can be programmatically defined to receive user inputs (e.g., a selection, click, touch, or gesture) as internal triggers that load interactive graphics elements for display on the video content. The instructions can also implement automatically received inputs (e.g., new data, changes in data, and calculated observations in data) as external triggers that load interactive elements for display on the video content. By way of example, an internal trigger can be logic in the instructions to receive user selection of a TWITTER icon to open an interface overlaid on the video content to send, receive, and review tweets. Also, an external trigger can be logic in the instructions to receive an update in weather conditions and if a severe change in weather conditions has occurred, a weather-based interactive graphics element can be overlaid on the video content. Other variations and combinations of triggers are contemplated with embodiments described herein.

It is contemplated that the interactivity content editor component can support HTML, CSS, JS and other variations and combinations of programming languages for generating the interactivity instructions (e.g., video markup objects) that are synchronized with the underlying video. The interactivity content editor can specifically access an interactivity development component 150 and interactivity services component 160 when generating an interactive graphics track to, respectively, facilitate development and embed cloud supported interactive features in the interactive graphics track.

Interactive graphics tracks can be generated based on attributes of video content. Interactive graphics tracks can be time-coded to correspond to video frames, where video frames correspond to information that can be used for interactive content. For example, the interactive graphics tracks contain information about scenes and related information, fictional information, and individual or combination of interactive graphic elements (e.g., widgets). Interactive graphics tracks can include animation and synchronization of interactive graphic elements to the underlying video content such that two are seamlessly integrated with each other.

The interactive graphic tracks can be generated with interactive instructions (e.g., software logic) that correspond to portions of the video content (e.g., video frames). The interactivity instructions can specifically implement interactive and non-interactive widgets that are synchronized with the video content. Interactive graphics elements variations can include descriptions of scenes, polling questions, behind-the-scenes information, and social media interactivity. Interactive graphics tracks may be generated such that the interactive graphics elements are displayed in a manner similar to traditional broadcast graphics.

Individual graphics tracks can be classified for specific functionality to be determined at the layered interactive video platform components. For example, a metadata track can be identified for social media widget functionality, static widget functionality, secondary storyline functionality, or dynamic widget functionality. In this regard, a video stream can include multiple interactive graphics tracks with each associated with different type of functionality and as such interactivity components can efficiently manage and administer the different interactive graphics tracks based on their classification.

A z-ordering mechanism for prioritizing display and input focus of the interactive graphics elements can be implemented based on the interactive graphics tracks. Generally, interactive graphics elements categorized into classes can each belong to specific layers. For example, interactive graphics elements for social media interactivity can be of a first class and be presented in a first layer in the z-order, while interactive graphics elements for broadcast content interactivity can be of a second class and be presented in a second layer in the z-order. With each increasing z-order layer interactive graphics elements are displayed above the prior layer. The focus states and interactivity can be based on z-order with end-user ability to navigate the layer using interface controls.

In one embodiment, the z-order mechanism can be implemented to layer interactive graphics elements in different individual layers. In this regard, if the user is interacting with the transport controls (e.g., play, pause, rewind, and fast-forward) and multiple interactive graphics elements are on the screen at the same time, the user can interact with the transport controls and the interactive graphics elements based on specifically designated input (e.g., unique button, touch input, or gesture). User can switch back and forth between features and options of the interactive graphics elements and the transport controls. For example, a user can navigate from a video screen to read scene specific information, encyclopedia content, or watch alternative video content (e.g., storylines, advertising, behind-the-scenes footage) related to a particular portion of the video content in the timeline. It is further contemplated that interactive graphics elements can be notifications that are communicated to a user on top of the video content such that a user can be alerted when a new show is available and interact with the notification (e.g., dismiss notification to continue watching video). Having multiple layers that overcome input limitations for a single layer by programming interactivity on multiple layers. Further, interactive graphics elements within the same layer can have layer specific rules which facilitate managing the interactivity and display of elements of a layer.

The interactive graphics tracks and video content can be stored in the content management component 130 and published therefrom. As such, when an end-user selects a video for playback, during playback, the video content can be delivered from the content management component with the interactive graphics tracks and the video content synchronized with the interactive functionality. It is contemplated that the interactivity instructions in interactive graphics tracks can define user input (e.g., internal triggers) or automatic inputs (e.g., external triggers) that load different types of interactive graphics elements or widgets. By way of example, interactivity instructions can allow an end-user to manipulate video playback, transport control (e.g., pause, play, rewind, fast-forward) functionality for video content, deviation from sequential video content (e.g., branching video content), playing additional audio tracks, and so on. Start Screen and End Screen interactive graphics tracks are also possible using the interactivity instructions.

Interactivity instructions in interactive graphics tracks can be configured to retrieve information to compose interactive graphic elements. Information that facilitate composing interactive graphics elements can include information from the cloud computing infrastructure component, external resources, resources local to the media device, and a combination thereof. For example, the instructions may retrieve metadata about the video content currently being viewed or alternatively, retrieve stored information about viewing habits and customize interactive graphics elements based on past user behavior. A user can configure a profile (e.g., location, favorites, preferences) or local resources (e.g., picture, video, media content) on a local media device in association with the cloud computing infrastructure component, such that, information composing interactive elements can be based on accessing the local profile, the cloud computing infrastructure or a combination thereof to compose interactive graphics elements. For example, launching a social media application that is defined using interactive graphics instructions on an interactive graphics track and loaded based on some internal or external trigger can involve accessing different types of resources to support the interactivity while overlaid on video content.

The content management component 130 can retrieve, store, and transmit the interactive graphics tracks and video content. It is contemplated that metadata (e.g., interactivity metadata) corresponding to video content can also be stored in the content management component 130 where it can be used during interactive graphics track generation. Interactivity metadata can refer to information that is retrieved to fill in placeholders in interactive graphic tracks. For example, when generating interactive graphic tracks with interactive instructions certain placeholders can be configured such that upon retrieving the interactivity metadata from a user of the content management component 130, the interactivity instructions can be executed based on the retrieved interactivity metadata.

The interactivity instructions generated at the interactivity content editor component 110 can be based on the functionality identified and made available using an interactivity development component 150. The interactivity development component 150 can support an integrated development environment that provides comprehensive facilities in a development environment (e.g., a timeline tool) for interactive graphics track development. Generally the interactivity content editor component 110 supports authoring, modifying, and communicating interactive graphics tracks associated with corresponding video content. In particular, interactive graphics track development can be based on cloud-based interactivity services via an interactivity service component 160 that can be associated with interactivity instructions that initialize the cloud-based interactivity services when the interactivity instructions are executed.

Cloud-based interactivity services can generally refer to interactivity services made available via the internet from the interactivity services component 160. The interactivity services component 160 can support interactive graphics track generation at the interactivity content editor component 110 and support interactive graphics track implementation the interactivity component 172. Cloud-based interactivity services at a high level support a centralized collection of interactive applications that can be supported and dynamically integrated from the cloud to interactive graphics elements. Interactivity instructions embedded in the interactive graphics track facilitate initializing cloud-based interactivity services. Interactivity services include services that facilitate exchange of data and commands between an end-user media device and the cloud, based on an interactive graphics tracks, for immediate results and updated information. Advantageously, the cloud-based interactivity services can be designed to provide easy, scalable access to applications, resources and service, fully managed by a cloud services provider. A cloud-based interactivity service can dynamically scale to meet the needs of end-users on media devices, and because the layered interactive video platform system is supported via the cloud computing infrastructure, individual cloud-services can be readily be available without need for deploying all new infrastructure resources.

By way of example, cloud-based interactivity services can support launching an application with interactive graphics elements based on interactivity instructions. Specifically, a cloud-based service can work with TWITTER to search and display recent tweets containing a hashtag identified in an interactive graphics track (e.g., metadata track). Displaying recent tweets includes launching a TWITTER application at an end-user media device can be based on identifying a hashtag incorporated in metadata. Identifying the hashtag can be supported based in part on an interactivity component at a media device that receives a user input indicating interactive graphic elements associated with the cloud-based TWITTER service. A user can also follow an on-screen personality directly from the interactive graphics elements displayed on the media device, where the interactive graphics elements are associated with the cloud-based service that supports integrating a user account with interactivity component. In this regard, an application or cloud-based service in not launched in isolation of the video content but contemplates launching with respect to an interactivity context that includes the programmatically defined trigger, the active video content and corresponding interactivity metadata.

In another example, the interactivity services component can support a localization service resource. A localization service resource interactively adapts interactive graphics tracks to different languages, regional differences, design look and feel, and technical requirements, amongst other features. In this regard, the interactive graphics tracks can be generated using the localization service resource and identify interactive graphics elements and programmatically define features for localization. When the interactive graphics track is executed, composition of the interactive graphics elements can be based on accessing localization services in the cloud for generating interactive graphics that are adapted for a particular media device. The localization service resource can also use an interactivity context of a trigger input, active video content and corresponding interactivity metadata to implement aspects of the localization services. Other variations and combinations of a localization service resource integrated into interactive graphics tracks are contemplated with embodiments of the present disclosure.

In embodiments of the present invention, interactive graphics tracks are constructed and maintained independently of the video content, as such, the interactive graphics tracks can be authored, modified, and processed separately from the video content. Maintained independently can also specifically refer to the interactive graphics tracks not being pre-rendered with the corresponding video content. In this regard, interactive graphics tracks can support dynamic layering of interactive graphics elements on video content. The interactive graphics tracks can be retrieved from the content management component and also be dynamically updated with new and additional interactive graphics elements and functionality based on cloud-based interactivity services of the content management component 130.

The interactivity component 172 can receive interactive graphics tracks and process the interactive graphics tracks to provide interactivity functionality, as discussed herein. The interactivity component 172 can also be further be configured to receive input based on an interactive graphic tracks. Input can include a one or more of a click, touch, gesture, and selection from a user interface or other interface communication of information associated with an interactive graphics element. The interactivity component 172 can reference a feature defined for the interactive graphic element based on the interactive instructions. The interactive instructions can be differ based on the type of input received. The feature of the interactive graphic element can be implemented based on the interactive instructions. In one embodiment, implementing the feature can include initializing a cloud-based interactivity service at a media device comprising the interactive component. Initializing the cloud-based interactivity service can launch an application (e.g., social networking service) where launching the application can include accessing external resource 180 for additional information. The external resources 180 component can provide information that is not readily available with the cloud computing infrastructure 120 or provide additional services supported by third-party providers.

With reference to the layered interactive video platform, embodiments described herein can further improve interactive video experiences based on components implemented based on the layered interactive video platform. Layered interactive video platform components refer to integrated components that facilitate the generating and communicating interactive graphics tracks and corresponding video content. The integrated components refer to the hardware architecture and software framework that support interactive video functionality using the layered interactive video platform. The hardware architecture refers to generic physical components and interrelationships thereof and the software framework refers to software providing functionality that can be implemented with hardware operated on a device. Specifically, the hardware architecture may be generic to simplify the functionality described herein using the software framework of the layered interactive video platform. The end-to-end software-based layered interactive video platform can operate with the layered interactive video platform components to operate computer hardware to provide layered interactive video platform functionality. As such, the layered interactive video platform components can manage resources and dynamically provides services for interactive video functionality. Any other variations and combinations thereof are contemplated with embodiments of the present invention.

By way of example, the layered interactive video platform can include an API library that includes specifications for routines, data structures, object classes, and variables which may support the interaction the hardware architecture of the device and the software framework of the unified layered interactive video platform system. These APIs include configuration specifications for the layered interactive video platform system such that the interactivity content editor component, the content management component and the interactivity component can communicate with each other layered interactive video platform infrastructure, as described herein.

An exemplary implementation of the layered interactive video platform can be in a cloud computing infrastructure. A layered interactive video platform can be implemented on a cloud computing infrastructure that runs cloud applications and services across different data center and geographic regions. The cloud computing infrastructure can implement a fabric controller component for provisioning and managing resource allocation, deployment/upgrade, and management of cloud applications and services. Typically, a cloud computing infrastructure acts to store data or run applications and services in a distributed manner. The application and service components of the cloud computing infrastructure may include nodes (e.g., computing devices, processing units, or blades in a server rack) that are allocated to run one or more portions of applications and services.

When multiple applications and services are being supported by the nodes, the nodes may be partitioned into virtual machines or physical machines that concurrently run the separate service applications, respectively, in individualized computing environments that support the resources and/or operating system specific to each service application. Further, each application or service may be divided into functional portions such that each functional portion is able to run on a separate virtual machine. In cloud computing infrastructures, multiple servers may be used to run the applications and services to perform data storage operations in a cluster. In particular, the servers may perform data operations independently but exposed as a single device referred to as a cluster. Each server in the cluster may be referred to as a node. A cloud-based implementation of the layered interactive video platform can leverage the scalability and durability of the corresponding cloud computing infrastructure to support the layered interactive video functionality described herein.

Figure 2:
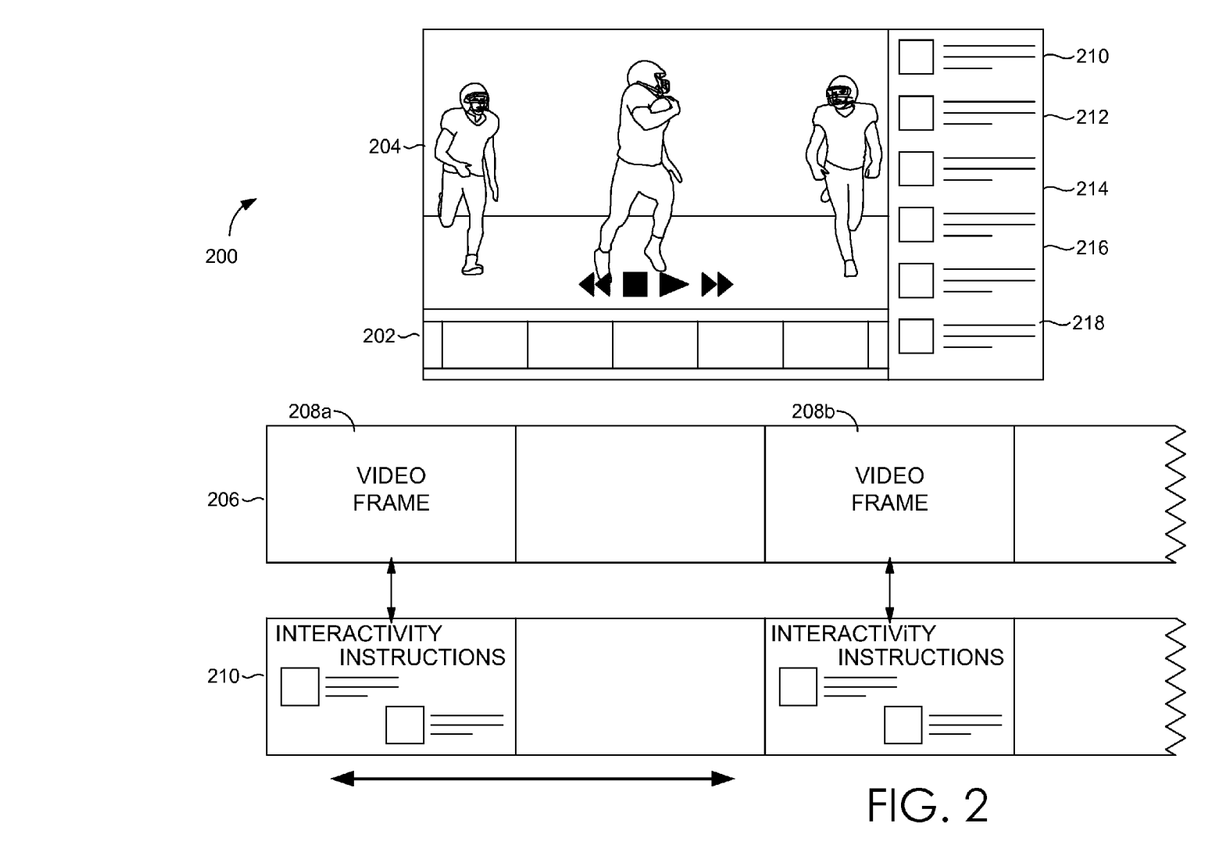
FIG. 2 is a schematic of exemplary display of an interactivity content editor component, in accordance with embodiments described herein.

With reference to FIG. 2, an exemplary interface of the interactivity content editor component 110 is illustrated. The interactivity content editor component 110 provides an integrated development environment 200 for generating interactive graphics tracks (e.g., interactive graphics track 202). The integrated development environment 200 can function with a graphical interface or display 204 for authoring, modifying, previewing and communicating the interactive graphics track. The interactive graphics track 202 can correspond to video content 206 where the video content can be presented in a timeline. The timeline can support associating interactivity instructions with portions (e.g., video fame 208a and video frame 208b) of the video content 206. The interactivity instructions can specifically define interactive graphics elements that perform interactivity functions. Interactivity graphic elements can correspond to metadata 210 of the video content or in a particular video frame 208a or 208b. The interactivity instructions can also be incorporated into the interactive graphics track 202 to initialize a plurality of cloud-based interactivity services that are accessible via the content management component 130. In one exemplary embodiment, the content management component can be implemented in the cloud computing infrastructure 120. Cloud-based interactivity services can include z-order placement 212, template resources 214, social networking app launchers 216, and external content sources 218. In this regard, the interactivity graphics track can trigger interactivity functionality based on the interactivity instructions when processed at an interactivity component of a media device.

Figure 3:
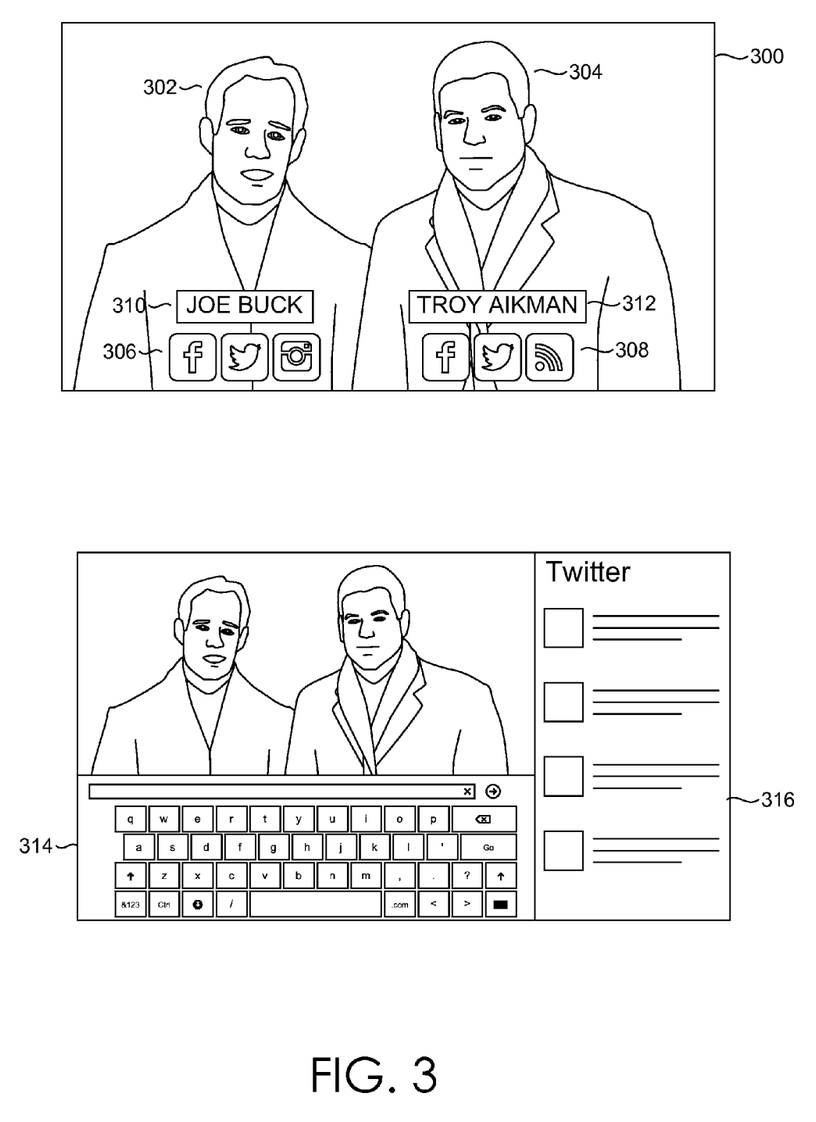
FIG. 3 is a schematic of an exemplary display of a media device based on a layered interactive video platform, in accordance with embodiments described herein.

With reference to FIG. 3, an exemplary display 300 of interactivity graphics elements on a media device is provided. The interactivity functionality provided via the media device for display can be facilitated by an interactivity component on the media device that receives and processes the interactive graphics track and the interactivity instructions comprised therein. By way of example, an interactive graphics track can be associated with a live broadcast of video content. A content producer can actively provide interactive graphics tracks with a live feed of the video content. The interactive graphics tracks can be transmitted based on particular video content. For example, when the two on-screen personalities 302 and 304 are being shown, the interactive graphics track can include instructions to generate interactive graphical elements 306 and 308 respectively. The interactive graphical elements 306 and 308 are capable of interactivity, for example, one of the icons of 306 and 308 are selectable to exchange additional information. It is contemplated that the interactive graphics elements can be communicated in parallel but separately from traditional broadcast graphics (e.g., on-screen personality names—310 and 312).

The interactive graphics track can further initialize cloud-based service associated with the interactive graphics elements. By way of example, generating the TWITTER icon and receiving user input selecting the icon can initialize a cloud-based interactive TWITTER service that launches an application and fully supports interactivity. Interactivity can be by way of additional interactive graphics elements (e.g., on-screen keyboard 314 and TWITTER feed 316) and features displayed on the media device. The interactivity can specifically be associated with the video content. In this regard, the TWITTER application is not merely launched in isolation but launched and integrated with the video content active on screen based at least in part on the interactivity instructions and the cloud-based interactivity services. The cloud-based TWITTER service integrated into a media device display as an interactive feature can provide additional content dynamically while leveraging the cloud computing infrastructure and access to external content sources. Other variations and combination of cloud-based interactivity services integrated and layered over video content for interactivity and applications at a media device are contemplated with embodiments of the present disclosure.

Figure 4:
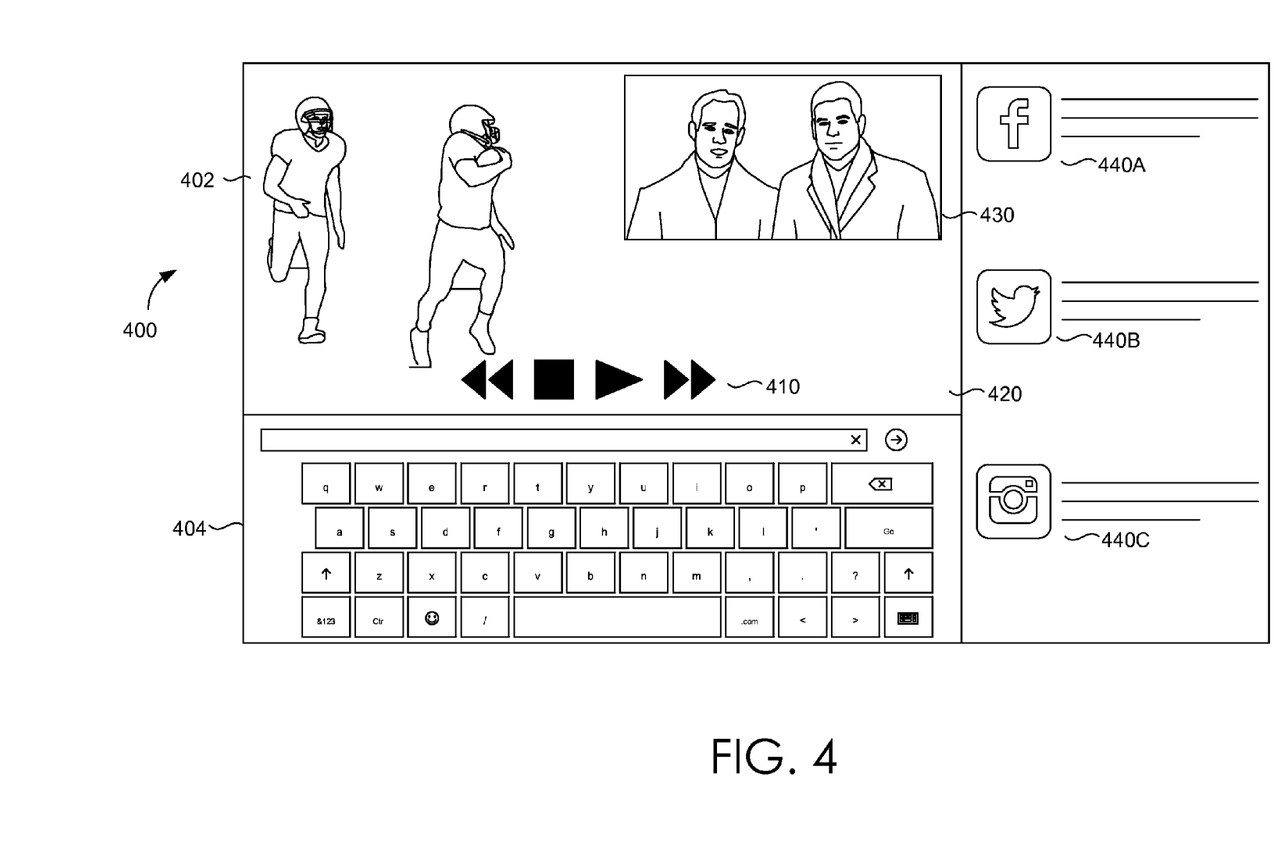
FIG. 4 is a schematic of an exemplary display of a media device based on a layered interactive video platform system, in accordance with embodiments described herein.

Turning now to FIG. 4, an exemplary display 400 of interactivity graphics elements on a media device is provided. The interactivity functionality provided via the media device for display can be facilitated by an interactivity component on the media device that receives and processes the interactive graphics track and the interactivity instructions comprised therein. In particular, the interactive graphics track can support a z-order mechanism as discussed herein. FIG. 4 illustrates layering of interactive graphics elements (e.g., transport controls 410, picture video content 420, and picture-in-picture video content 430, and social media interactive graphic elements 440A, 440B, and 440C. It is contemplated the interactive graphics elements are generated based on an interactivity context of a trigger input, active video content and corresponding interactivity metadata. In embodiments, an input interface (e.g., keyboard 404) can be generated as part of the display 402; however other types of user input interfaces are contemplated with embodiments described herein.

In operation, the z-order mechanism can enable a user to toggle back and forth between interacting with transport controls (e.g., play, pause, rewind, and fast-forward) and other interactive graphics elements. By way of example, if a user interface (e.g., television display) includes multiple interactive graphics elements, the user can interact with all of the interactive graphics elements at the same time. In one embodiment, the user can elect to interact with a particular graphical element based on a defined input (e.g., unique buttons or touch input).

In another embodiment, a user can alternate back and forth between interactive graphics element layers, such that, a user can access sub-layers of an interactive graphic element associated with the video. For example, an internal trigger or external trigger can generate a picture-in-picture interactive graphic element on a new layer and a user can leave the video screen to explore the additional video content. In other examples, the user can leave the primary video content and navigate other interactive graphic element layers to read scene specific information, encyclopedia content or watch additional behind the scenes video related to a point in a video timeline. In yet another embodiment, an interactive graphic element layer can support communication of notifications to a user on top of video. For example, a notification can indicate to the user the availability of new content (e.g., a new show) and the interactive graphic element layer notification can be selected for additional functionality (e.g., open the new show or dismiss the notification). Advantageously, the layering of interactive graphic elements can overcome possible limitations with regard to number of inputs at a given point in time.

Figure 5:
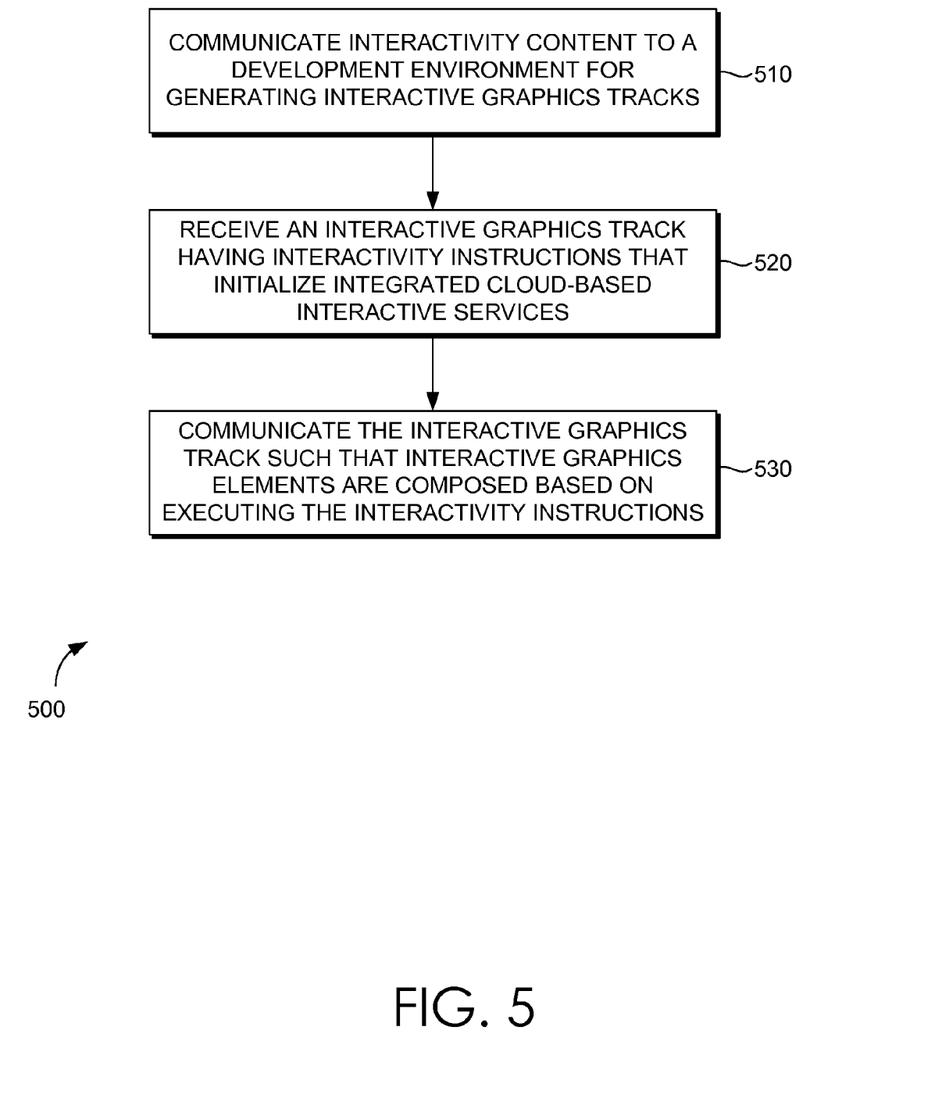
FIG. 5 is a flow diagram showing an exemplary method for generating interactive video content based on a layered interactive video platform system, in accordance with embodiments described herein.

Turning now to FIG. 5, a flow diagram is provided that illustrates a method 500 for generating interactive video content based on a layered interactive video platform system. Initially at block 510, interactivity content is communicated to an integrated development environment for generating interactive graphics tracks. The interactivity content comprises cloud-based interactivity services resources that support in interactive functionality. At block 520, an interactive graphics track having interactivity instructions that initialize integrated cloud-based interactivity services is received. The interactive graphics track is received using a layered video platform supports communicating interactive graphics tracks, between interactive content editor components, cloud interactivity components, and client interactivity components. The interactive graphics track is generated based on accessing the integrated development environment comprising comprehensive facilities for generating the interactive graphics track. At block 530, the interactive graphics track is communicated such that interactive graphics elements are composed based on executing the interactivity instructions that define features of the interactive graphics elements. Composing the interactive graphics elements comprises accessing cloud-based interactivity services corresponding to the interactivity instructions.

Figure 6:
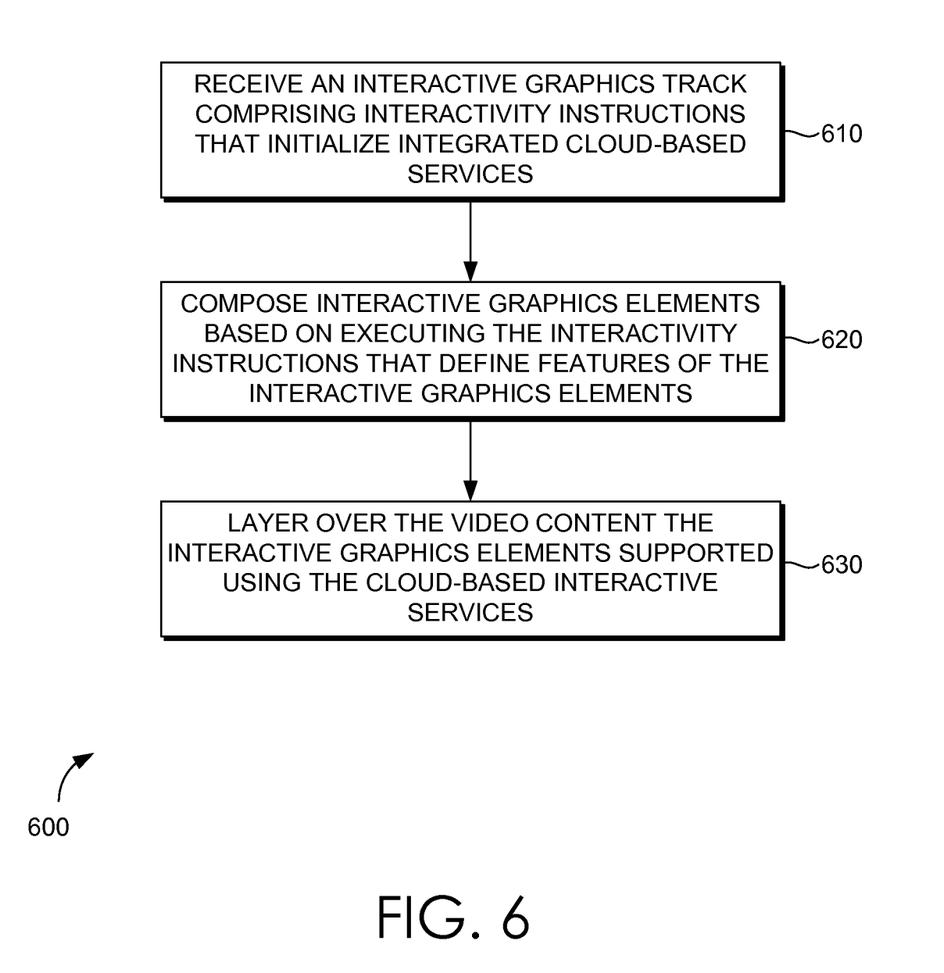
FIG. 6 is a flow diagram showing an exemplary method for generating interactive video based on a layered interactive video platform system, in accordance with embodiments described herein.

Turning now to FIG. 6, a flow diagram is provided that illustrates a method 600 of generating interactive videos based on layered interactive video platforms. Initially at block 610, the interactive graphics track comprising interactivity instructions that initialize integrated cloud-based interactivity services is received. The interactive graphics track is received using a layered video platform that supports communicating interactive graphics tracks between interactive content editor components, cloud interactivity components, and client interactivity components. At block 620, interactive graphics elements are composed based on executing the interactivity instructions that define features of the interactive graphics elements. Composing the interactive graphics elements comprises accessing cloud-based interactivity services corresponding to the interactivity instructions. At block 630, the interactive graphics elements supported using the cloud-based interactivity services are layered over video content.

Figure 7:
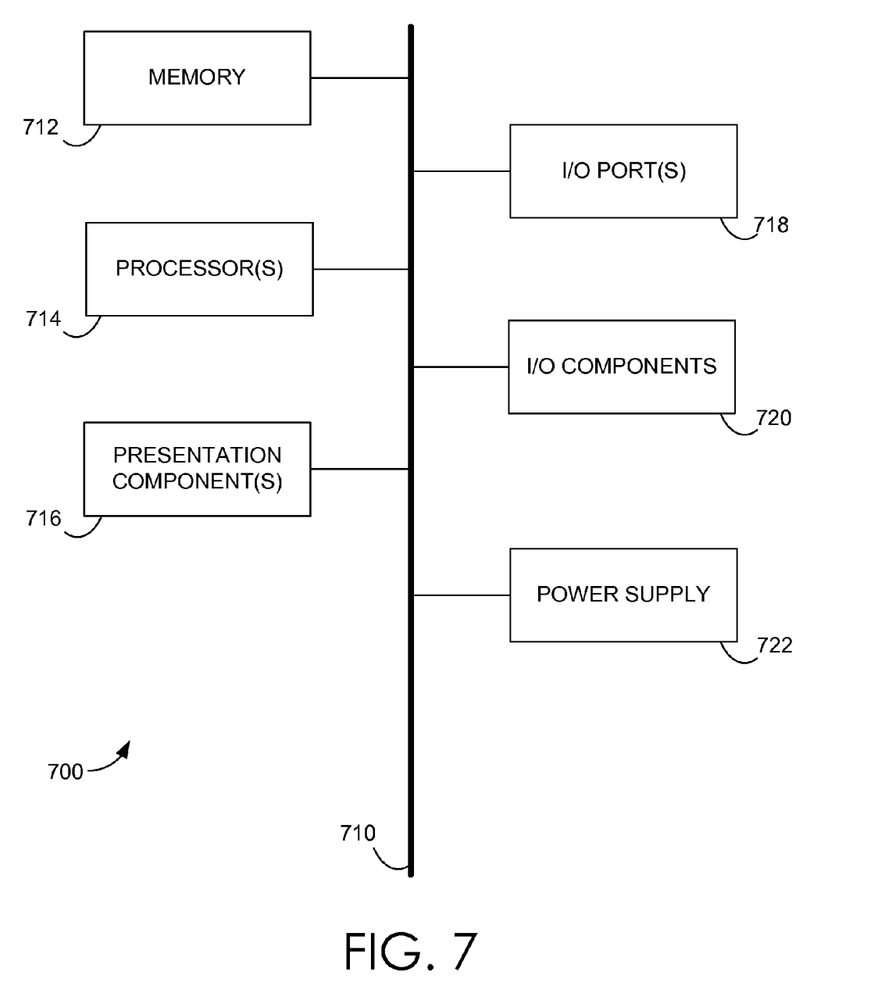
FIG. 7 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Accordingly, in a first embodiment described herein, a system for generating interactive videos based on layered interactive video platforms is provided. The system includes an interactivity content editor component configured for: accessing video content; generating interactivity instructions based on a layered interactive video platform, wherein the layered video platform supports interactive graphics tracks functionality on interactive content editor components, cloud interactivity components, and client interactivity components. The interactivity instructions initialize integrated cloud-based interactivity services based on interactive graphics elements in interactive graphics tracks; generating an interactive graphics track. Further the interactive graphics track comprises the interactive graphics elements, the interactive graphic elements programmatically defined for dynamic composition based on interactivity instructions that define features of the interactive graphics elements. The interactivity content editor component can then communicate the interactive graphics track.

The system further includes a content management component configured for: receiving the interactive graphics track having interactivity instructions that initialize integrated cloud-based interactivity services; and communicating the interactive graphics track such that the interactive graphics elements are composed based on executing the interactivity instructions. The system also includes an interactivity component configured for: receiving the interactive graphics track comprising interactivity instructions that initialize the integrated cloud-based interactivity services; composing interactive graphics elements based on executing the interactivity instructions that define features of the interactive graphics elements. Composing the interactive graphics elements comprises accessing cloud-based interactivity services corresponding to the interactivity instructions; and layering over the video content the interactive graphics elements supported using the cloud-based interactivity services.

In a second embodiment described herein, a computer-implemented method for generating interactive videos based on layered interactive video platforms is provided. The method includes receiving an interactive graphics track having interactivity instructions that initialize integrated cloud-based interactivity services, where the interactive graphics track is received using a layered video platform that supports communicating interactive graphics tracks, between interactive content editor components, cloud interactivity components, and client interactivity components. The interactive graphics track is generated based on accessing an integrated development environment comprising comprehensive facilities for generating the interactive graphics track. The method further includes communicating the interactive graphics track, such that, interactive graphics elements are composed based on executing the interactivity instructions that define features of the interactive graphics elements, where composing the interactive graphics elements comprises accessing cloud-based interactivity services corresponding to the interactivity instructions.

In a third embodiment described herein, one or more computer storage media having computer-executable instructions embodied thereon that, when executed, by one or more processors, causes the one or more processors to perform a method for generating interactive videos based on layered interactive video platforms is provided. The method includes receiving the interactive graphics track comprising interactivity instructions that initialize integrated cloud-based interactivity services, where the interactive graphics track is received using a layered video platform that supports interactive graphics tracks at interactive content editor components, cloud interactivity components, and client interactivity components. The method further includes composing interactive graphics elements based on executing the interactivity instructions that define features of the interactive graphics elements, wherein composing the interactive graphics elements comprises accessing cloud-based interactivity services corresponding to the interactivity instructions. The method also includes layering over the video content the interactive graphics elements supported using the cloud-based interactivity services.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for generating interactive videos based on layered interactive video platforms, the system comprising:
an interactivity content editor component configured for:
accessing video content;
generating interactivity instructions based on a layered interactive video platform, wherein the layered video platform supports communicating interactive graphics tracks between interactive content editor components, cloud interactivity components, and client interactivity components, wherein the interactivity instructions initialize integrated cloud-based interactivity services based on interactive graphics elements in interactive graphics tracks;
generating an interactive graphics track, wherein the interactive graphics track comprises the interactive graphics elements, the interactive graphic elements programmatically defined for dynamic composition based on interactivity instructions that define features of the interactive graphics elements; and
communicating the interactive graphics track;
a content management component configured for:
communicating interactivity content to an integrated development environment for generating an interactive graphics tracks, wherein interactivity content comprises cloud-based interactivity services resources that support interactive functionality;
receiving the interactive graphics track having interactivity instructions that initialize integrated cloud-based interactivity services; and
communicating the interactive graphics track such that the interactive graphics elements are composed based on executing the interactivity instructions; and
an interactivity component configured for:
receiving the interactive graphics track comprising interactivity instructions that initialize integrated cloud-based interactivity services, wherein the interactive graphics track is one of a plurality of interactive graphics tracks for the video content, wherein specific functionality associated with the video content is embedded in a corresponding interactive graphics track classified for the specific functionality;

composing interactive graphics elements based on executing the interactivity instructions that define features of the interactive graphics elements, wherein composing the interactive graphics elements comprises accessing cloud-based interactivity services corresponding to the interactivity instructions; and layering over the video content the interactive graphics elements supported using the cloud-based interactivity services.

2. The system of claim 1, wherein accessing the video content comprises identifying interactivity metadata, wherein the interactive graphics track comprises interactivity instructions that define placeholders associated with interactivity metadata such that upon retrieving interactivity metadata the interactivity instructions are executed based on the retrieved interactivity metadata, wherein the interactivity metadata corresponds to metadata of the video content.

3. The system of claim 1, wherein the interactive content editor component is further configured for:

accessing the integrated development environment comprising comprehensive facilities for generating an interactive graphics track, wherein generating the interactive graphics track comprises referencing from an interactivity services component, one or more of the following:

a cloud-based interactivity service resource that is programmatically defined in the interactivity instructions, wherein a corresponding cloud-based interactivity service is initialized when the interactive instructions are executed, the cloud-based interactivity service is associated with interactive graphics elements;

a display prioritization resource that programmatically prioritizes specific layers and input focus of interactive graphics elements; and an interactivity instructions template resource that programmatically defines pre-built features that are associated with customizable cloud-based interactivity services and interactive graphic elements.

4. The system of claim 3, wherein the interactive content editor component is configured for providing an interface for:

identifying metadata associated with the video content;

constructing the interactive graphics elements corresponding to the cloud-based interactivity services, the display prioritization resource and the interactivity instructions templates based on the metadata; and generating the interactive graphics track based on the interactive graphic elements.

5. The system of claim 3, wherein the cloud-based interactivity services resource is a localization service resource that adapts interactive graphics tracks based on interactivity instructions to generate localized interactive graphical elements.

6. The system of claim 1, wherein interactive graphics tracks and cloud-based interactivity services are implemented based on an interactivity context comprising user input, active video content, and corresponding metadata.

7. The system of claim 1, wherein the interactive graphics track comprises interactive graphical elements that correspond to functionality of social networking services, wherein performing interactive operations that correspond to the functionality is based on receiving input directed at the functionality of the social networking service.

8. A computer-implemented method for generating interactive videos based on layered interactive video platforms, the method comprising:

communicating interactivity content to an integrated development environment for generating an interactive graphics tracks for video content, wherein interactivity content comprises cloud-based interactivity services resources that support interactive functionality, wherein the cloud-based interactivity services comprise a collection of cloud-based interactivity applications that are dynamically integrated into the video content using interactive graphics elements;

receiving an interactive graphics track having interactivity instructions that initialize integrated cloud-based interactivity services, wherein the interactive graphics track is one of a plurality of interactive graphics tracks for the video content, wherein specific functionality associated with the video content is embedded in a corresponding interactive graphics track classified for the specific functionality, wherein the interactive graphics track is received using a layered video platform that supports communicating interactive graphics tracks between interactive content editor components, cloud interactivity components, and client interactivity components, wherein the interactive graphics track is generated based on accessing the integrated development environment comprising comprehensive facilities for generating the interactive graphics track; and communicating the interactive graphics track independently of the video content such that interactive graphics elements are composed based on executing the interactivity instructions that define features of the interactive graphics elements, wherein composing the interactive graphics elements comprises accessing cloud-based interactivity services corresponding to the interactivity instructions.

9. The method of claim 8, wherein the video content is a live broadcast that is associated with the interactivity instructions in near real-time, wherein the live broadcast video track and the interactive graphics track are communicated to a plurality of different types media devices for composition and display or wherein the video content is pre-recorded video content, and wherein the pre-recorded video content and the interactive graphics track are stored in a content management component and communicated in parallel upon receiving a request from a media device.

10. The method of claim 8, wherein the interactive graphics track comprises interactivity instructions that define placeholders associated with interactivity metadata such that upon retrieving interactivity metadata the interactivity instructions are executed based on the retrieved interactivity metadata, wherein the interactivity metadata corresponds to metadata of the video content.

11. The method of claim 8, wherein the interactive graphics track is associated with a secondary video track, wherein the secondary video track is a branching video track or a picture-in-picture interactivity graphics element that when triggered, based on the interactivity instructions, operates with the interactive graphics track to provide interactive functionality.

12. The method of claim 8, wherein the specific functionality is selected from one of the following: social media functionality, static widget functionality, storyline functionality, and dynamic widget functionality.

13. One or more computer storage media having computer-executable instructions embodied thereon that, when executed by one or more processors, cause the one or more processors to perform a method of generating interactive videos based on layered interactive video platforms, the method comprising receiving an interactive graphics track comprising interactivity instructions for video content, the interactivity instructions initialize integrated cloud-based interactivity services, wherein the interactive graphics track is one of a plurality of interactive graphics tracks for the video content, wherein specific functionality associated with the video content is embedded in a corresponding interactive graphics track classified for the specific functionality, wherein the interactive graphics track is received using a layered video platform that supports communicating interactive graphics tracks between interactive content editor components, cloud interactivity components, and client interactivity components;

composing interactive graphics elements based on executing the interactivity instructions that define features of the interactive graphics elements, wherein composing the interactive graphics elements comprises accessing cloud-based interactivity services corresponding to the interactivity instructions; and layering over the video content the interactive graphics elements supported using the cloud-based interactivity services.

14. The media of claim 13, wherein composing the interactive graphics elements comprises:

referencing the metadata of the corresponding video content in the interactive graphics track;

using the metadata, identifying video content elements that are associated with interactive graphics elements; and providing the video content elements and the interactive graphics elements to implement the features defined for the interactive graphics elements.

15. The media of claim 13, wherein the interactivity instructions embedded in the interactive graphics track support initializing the cloud-based interactivity services that operate to exchange data and commands between a media device and cloud interactivity components for the cloud-based interactive applications.

16. The media of claim 13, wherein the layered interactive platform is implemented using presentation layer components for communications to support the layered interactive platform functionality.

17. The media of claim 13, further comprising:

receiving an input associated with an interactive graphics element;

referencing a feature defined for the interactive graphics element, wherein the feature is associated with interactivity instructions; and implementing the feature of the interactive graphics element based at least in part on the interactivity instructions.

18. The media of claim 17, wherein implementing the feature further comprises launching a cloud-based interactivity service application at a media device, wherein launching the cloud-based interactivity service application is indicated in the interactivity instructions, wherein the cloud-based interactivity service application is a social networking service, wherein launching the social networking service comprises accessing one or more external resources.

19. The media of claim 13, wherein the interactive graphics track comprises interactivity instructions that define placeholders associated with interactivity metadata such that upon retrieving interactivity metadata the interactivity instructions are executed based on the retrieved interactivity metadata, wherein the interactivity metadata corresponds to metadata of the video content.

20. The media of claim 13, wherein the specific functionality is selected from one of the following: social media functionality, static widget functionality, storyline functionality, and dynamic widget functionality.

* * * * *